US012587982B2

(12) United States Patent
Chandramouli et al.

(10) Patent No.: US 12,587,982 B2
(45) Date of Patent: Mar. 24, 2026

(54) APPARATUS, METHOD AND COMPUTER PROGRAM

(71) Applicant: Nokia Technologies Oy, Espoo (FI)

(72) Inventors: Devaki Chandramouli, Dallas, TX (US); Troels Emil Kolding, Aalborg (DK); Pilar Andrés Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 673 days.

(21) Appl. No.: 17/995,424

(22) PCT Filed: Apr. 7, 2020

(86) PCT No.: PCT/EP2020/059873
§ 371 (c)(1),
(2) Date: Oct. 4, 2022

(87) PCT Pub. No.: WO2021/204361
PCT Pub. Date: Oct. 14, 2021

(65) Prior Publication Data
US 2023/0180157 A1     Jun. 8, 2023

(51) Int. Cl.
*H04W 56/00*          (2009.01)
(52) U.S. Cl.
CPC ................................ *H04W 56/0015* (2013.01)
(58) Field of Classification Search
CPC ......................... H04W 56/0015; H04W 56/001
See application file for complete search history.

(56) References Cited

U.S. PATENT DOCUMENTS

| | | |
|---|---|---|
| 2006/0245454 A1 | 11/2006 | Balasubramanian et al. |
| 2012/0087328 A1 | 4/2012 | Park et al. |
| 2018/0176892 A1 | 6/2018 | Kim et al. |
| (Continued) | | |

FOREIGN PATENT DOCUMENTS

| | | |
|---|---|---|
| WO | 2019/243669 A1 | 12/2019 |
| WO | 2020/035130 A1 | 2/2020 |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

(Continued)

*Primary Examiner* — Ayanah S George
(74) *Attorney, Agent, or Firm* — Nokia Technologies Oy

(57) ABSTRACT

There is provided an apparatus, said apparatus comprising means for receiving, at a first network function, a request for a time synchronization service for a user equipment, the request comprising one of an indicator of a synchronization level and at least one synchronization parameter, if the at least one synchronization parameter is comprised in the request, determining, based on the at least one synchronization parameter, the indicator of the synchronization level, determining, based on at least one of the indicator of the synchronization level or the at least one synchronization parameter, at least one of synchronization policy and synchronization profile and providing the determined at least one of the indicator of the synchronization level, the synchronization policy and the synchronization profile to at least one of a further network function and the user equipment.

11 Claims, 8 Drawing Sheets

S1 — Receiving, at a first network function, a request for a time synchronization service for a user equipment, the request comprising one of an indicator of a synchronization level and at least one synchronization parameter S2 — If the at least one synchronization parameter is comprised in the request, determining, based on the at least one synchronization parameter, the indicator of the synchronization level S3 — Determining, based on at least one of the indicator of the synchronization level or the at least one synchronization parameter, at least one of synchronization policy and synchronization profile S4 — Providing the determined at least one of the indicator of the synchronization level, the synchronization policy and the synchronization profile to at least one of a further network function and the user equipment

(56)          References Cited

U.S. PATENT DOCUMENTS

2019/0090293 A1     3/2019  Su
2020/0059829 A1*    2/2020  Joseph ............. H04W 36/0011

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"Revised SID: Study on enhanced support of Industrial IoT-TSC/URLLC enhancements", SA WG2 Meeting #135, S2-1910756, Agenda: 9.1, Siemens AG, Jun. 14-18, 2019, 4 pages.

"TSN—Exposure for Time Synchronization", SA WG2 Meeting #136-AH, S2-2001417, Agenda: 8.10, Nokia, Jan. 13-17, 2020, pp. 1-3.

"3rd Generation Partnership Project; Technical Specification Group Services and System Aspects; Procedures for the 5G System (5GS); Stage 2 (Release 16)", 3GPP TS 23.502, V16.3.0, Dec. 2019, pp. 1-558.

"3rd Generation Partnership Project; Technical Specification Group Services and System Aspects; Policy and charging control framework for the 5G System (5GS); Stage 2 (Release 16)", 3GPP TS 23.503, V16.3.0, Dec. 2019, pp. 1-112.

"3rd Generation Partnership Project; Technical Specification Group Core Network and Terminals; Non-Access-Stratum (NAS) protocol for 5G System (5GS); Stage 3 (Release 16)", 3GPP TS 24.501, V16.3.0, Dec. 2019, pp. 1-645.

"3rd Generation Partnership Project; Technical Specification Group Core Network and Terminals; 5G System; Session Management Services; Stage 3 (Release 16)", 3GPP TS 29.502, V16.2.0, Dec. 2019, pp. 1-211.

"3rd Generation Partnership Project; Technical Specification Group Radio Access Network; NG-RAN; NG Application Protocol (NGAP) (Release 16)", 3GPP TS 38.413, V16.0.0, Dec. 2019, pp. 1-335.

Farkas et al., "5G-TSN integration meets networking requirements for industrial automation", Ericsson Technology Review, Aug. 27, 2019, pp. 1-10.

International Search Report and Written Opinion received for corresponding Patent Cooperation Treaty Application No. PCT/EP2020/059873, dated Jan. 25, 2021, 17 pages.

"QoS Negotiation between 3GPP and TSN networks KI#3.1", SA WG2 Meeting #129, S2-1810475, Agenda: 6.15.2, Huawei, Oct. 15-19, 2018, 10 pages.

"TSN-5GS QoS mapping", 3GPP TSG-SA WG2 Meeting #132, S2-1903376, Agenda: 6.15.2, Ericsson, Apr. 8-12, 2019, 7 pages.

"3rd Generation Partnership Project; Technical Specification Group Core Network and Terminals; 5G System; Session Management Policy Control Service; Stage 3 (Release 17)", 3GPP TS 29.512, V17.1.0, Dec. 2020, pp. 1-208.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V17.0.0, Mar. 2021, pp. 1-88.

* cited by examiner 300
304
303
302
301

Figure 4:
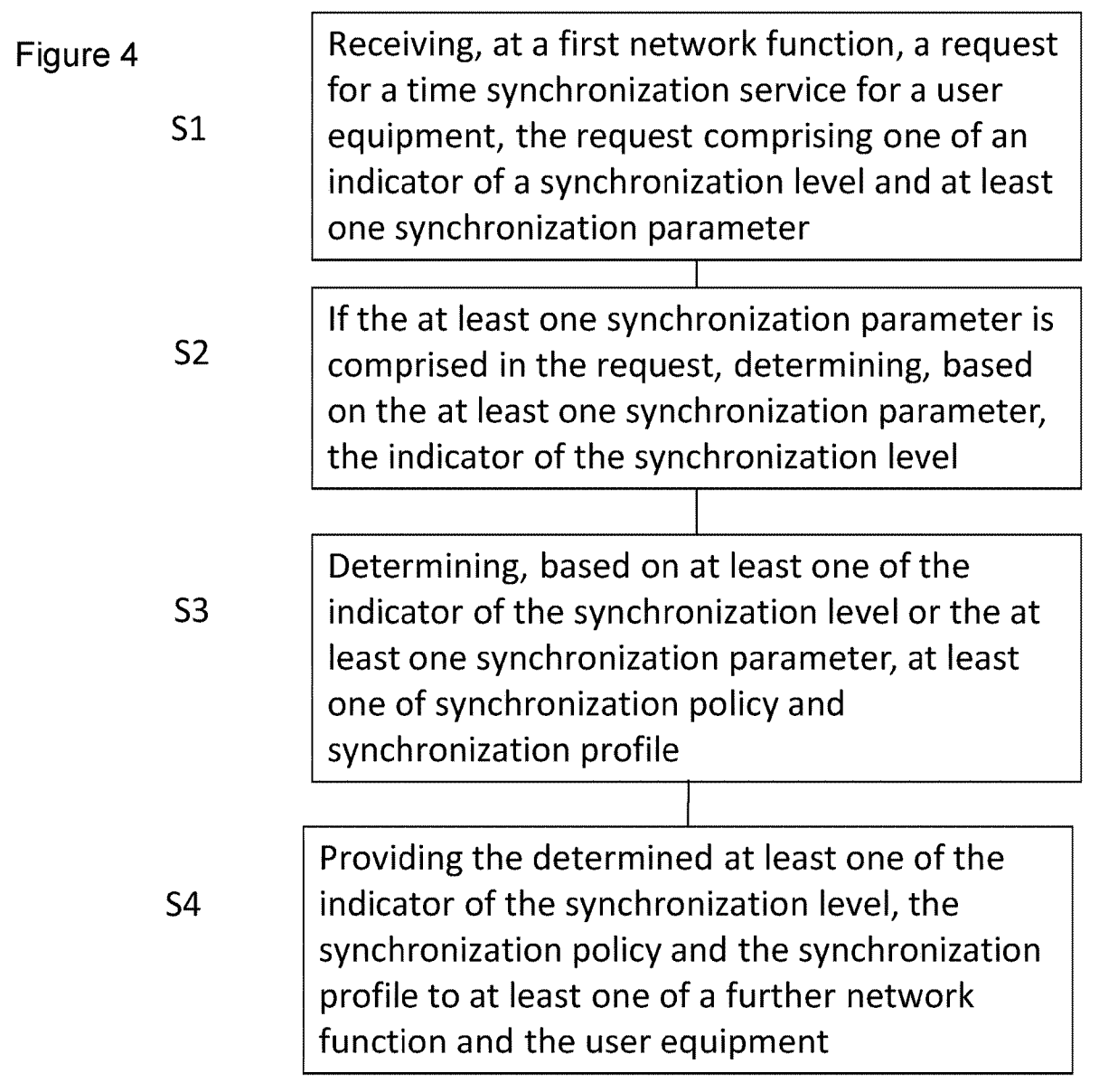

Receiving, at a first network function, a request for a time synchronization service for a user equipment, the request comprising one of an indicator of a synchronization level and at least one synchronization parameter

S2

If the at least one synchronization parameter is comprised in the request, determining, based on the at least one synchronization parameter, the indicator of the synchronization level

S3

Determining, based on at least one of the indicator of the synchronization level or the at least one synchronization parameter, at least one of synchronization policy and synchronization profile

S4

Providing the determined at least one of the indicator of the synchronization level, the synchronization policy and the synchronization profile to at least one of a further network function and the user equipment

Figure 5:
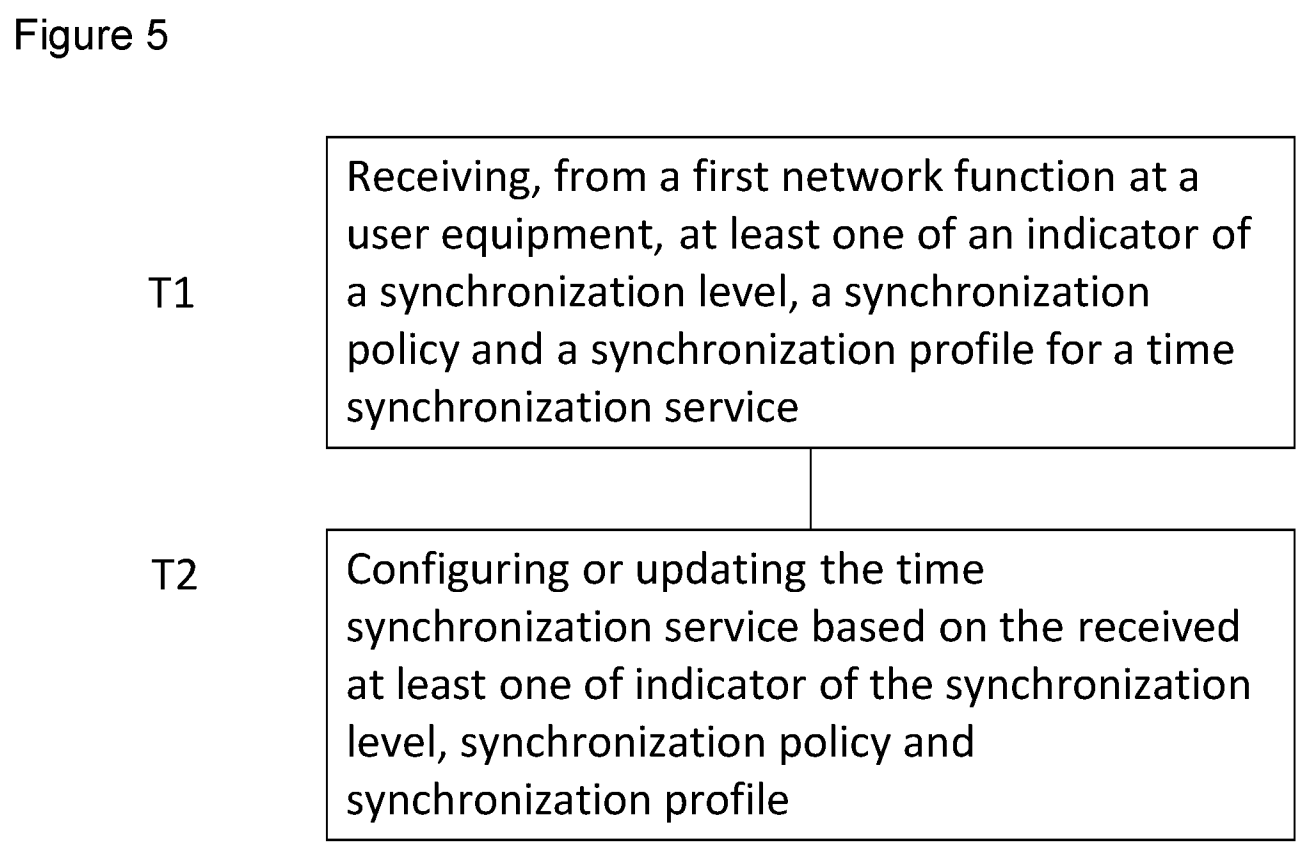

Receiving, from a first network function at a user equipment, at least one of an indicator of a synchronization level, a synchronization policy and a synchronization profile for a time synchronization service

T2

Configuring or updating the time synchronization service based on the received at least one of indicator of the synchronization level, synchronization policy and synchronization profile

APPARATUS, METHOD AND COMPUTER PROGRAM

RELATED APPLICATION

This application was originally filed as PCT Application No. PCT/EP2020/059873, filed on Apr. 7, 2020, which is incorporated herein by reference in its entirety.

FIELD

The present application relates to a method, apparatus, system and computer program and in particular but not exclusively to synchronization level definition for 5G.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for receiving, at a first network function, a request for a time synchronization service for a user equipment, the request comprising one of an indicator of a synchronization level and at least one synchronization parameter, if the at least one synchronization parameter is comprised in the request, determining, based on the at least one synchronization parameter, the indicator of the synchronization level, determining, based on at least one of the indicator of the synchronization level or the at least one synchronization parameter, at least one of synchronization policy and synchronization profile and providing the determined at least one of the indicator of the synchronization level, the synchronization policy and the synchronization profile to at least one of a further network function and the user equipment.

The indicator of the synchronization level may comprise a scalar.

The at least one synchronization parameter and/or synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with a synchronization service configuration.

The apparatus may comprise means for providing the determined at least one of the indicator of the synchronization level, the synchronization policy and the synchronization profile to the user equipment during a configuration update procedure.

The apparatus may comprise means for providing the determined at least one of the indicator of the synchronization level, the synchronization policy and the synchronization profile to the user equipment using protocol data unit session management messages.

The determined at least one of the indicator of the synchronization level, the synchronization policy and the synchronization profile may be associated with a protocol data unit session.

The apparatus may comprise means for receiving the one of the indicator of the synchronization level or the at least one synchronization parameter from at least one of the user equipment and an application function.

The request may comprise a request for synchronization parameters for the time synchronization or a request to modify synchronization parameters for the time synchronization service.

The further network function may be an application function.

The apparatus may comprise means for receiving, from at least one of the user equipment and an application function, an indication of which at least one synchronization parameter to determine.

The apparatus may comprise means for receiving policy information from a policy control function and determining at least one of the indicator of the synchronization level and the synchronization profile based on the policy information.

In a second aspect there is provided an apparatus comprising means for receiving, from a first network function at a user equipment, at least one of an indicator of a synchronization level, a synchronization policy and a synchronization profile for a time synchronization service and configuring or updating the time synchronization service based on the received at least one of indicator of the synchronization level, synchronization policy and synchronization profile.

The apparatus may comprise means for providing a request from the user equipment to the first network function for the time synchronization service, the request comprising of an indicator of a synchronization level and at least one synchronization parameter.

The request may comprise a request for synchronization parameters for the time synchronization or a request to modify synchronization parameters for the time synchronization service.

The indicator of the synchronization level may comprise a scalar.

The at least one synchronization parameter and/or the synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with synchronization service configuration.

The apparatus may comprise means for receiving the at least one of indicator of the synchronization level, the synchronization policy and the synchronization profile during a configuration update procedure.

The apparatus may comprise means for receiving the at least one of the indicator of the synchronization level, the synchronization policy and the synchronization profile using protocol data unit session management messages.

The indicator of the synchronization level, the synchronization policy and the synchronization profile may be associated with a protocol data unit session.

The apparatus may comprise means for: providing, the first network function, an indication of which at least one synchronization parameter to determine.

In a third aspect there is provided a method comprising receiving, at a first network function, a request for a time synchronization service for a user equipment, the request comprising one of an indicator of a synchronization level and at least one synchronization parameter, if the at least one synchronization parameter is comprised in the request, determining, based on the at least one synchronization parameter, the indicator of the synchronization level, determining, based on at least one of the indicator of the synchronization level or the at least one synchronization parameter, at least one of synchronization policy and synchronization profile and providing the determined at least one of the indicator of the synchronization level, the synchronization policy and the synchronization profile to at least one of a further network function and the user equipment.

The indicator of the synchronization level may comprise a scalar.

The at least one synchronization parameter and/or synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with a synchronization service configuration.

The method may comprise providing the determined at least one of the indicator of the synchronization level, the synchronization policy and the synchronization profile to the user equipment during a configuration update procedure.

The method may comprise providing the determined at least one of the indicator of the synchronization level, the synchronization policy and the synchronization profile to the user equipment using protocol data unit session management messages.

The determined at least one of the indicator of the synchronization level, the synchronization policy and the synchronization profile may be associated with a protocol data unit session.

The method may comprise receiving the one of the indicator of the synchronization level or the at least one synchronization parameter from at least one of the user equipment and an application function.

The request may comprise a request for synchronization parameters for the time synchronization or a request to modify synchronization parameters for the time synchronization service.

The further network function may be an application function.

The method may comprise receiving, from at least one of the user equipment and an application function, an indication of which at least one synchronization parameter to determine.

The method may comprise receiving policy information from a policy control function and determining at least one of the indicator of the synchronization level and the synchronization profile based on the policy information.

In a fourth aspect there is provided receiving, from a first network function at a user equipment, at least one of an indicator of a synchronization level, a synchronization policy and a synchronization profile for a time synchronization service and configuring or updating the time synchronization service based on the received at least one of indicator of the synchronization level, synchronization policy and synchronization profile.

The method may comprise providing a request from the user equipment to the first network function for the time synchronization service, the request comprising of an indicator of a synchronization level and at least one synchronization parameter.

The request may comprise a request for synchronization parameters for the time synchronization or a request to modify synchronization parameters for the time synchronization service.

The indicator of the synchronization level may comprise a scalar.

The at least one synchronization parameter and/or the synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with synchronization service configuration.

The method may comprise receiving the at least one of indicator of the synchronization level, the synchronization policy and the synchronization profile during a configuration update procedure.

The method may comprise receiving the at least one of the indicator of the synchronization level, the synchronization policy and the synchronization profile using protocol data unit session management messages.

The indicator of the synchronization level, the synchronization policy and the synchronization profile may be associated with a protocol data unit session.

The method may comprise providing, the first network function, an indication of which at least one synchronization parameter to determine.

In a fifth aspect there is provided an apparatus comprising: at least one processor and at least one memory including a computer program code, the at least one memory and computer program code configured to, with the at least one processor, cause the apparatus at least to receive, at a first network function, a request for a time synchronization service for a user equipment, the request comprising one of an indicator of a synchronization level and at least one synchronization parameter, if the at least one synchronization parameter is comprised in the request, determine, based on the at least one synchronization parameter, the indicator of the synchronization level, determine, based on at least one of the indicator of the synchronization level or the at least one synchronization parameter, at least one of synchronization policy and synchronization profile and provide the determined at least one of the indicator of the synchronization level, the synchronization policy and the synchronization profile to at least one of a further network function and the user equipment.

The indicator of the synchronization level may comprise a scalar.

The at least one synchronization parameter and/or synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with a synchronization service configuration.

The apparatus may be caused to provide the determined at least one of the indicator of the synchronization level, the synchronization policy and the synchronization profile to the user equipment during a configuration update procedure.

The apparatus may be caused to provide the determined at least one of the indicator of the synchronization level, the synchronization policy and the synchronization profile to the user equipment using protocol data unit session management messages.

The determined at least one of the indicator of the synchronization level, the synchronization policy and the synchronization profile may be associated with a protocol data unit session.

The apparatus may be caused to receive the one of the indicator of the synchronization level or the at least one synchronization parameter from at least one of the user equipment and an application function.

The request may comprise a request for synchronization parameters for the time synchronization or a request to modify synchronization parameters for the time synchronization service.

The further network function may be an application function.

The apparatus may be caused to receive, from at least one of the user equipment and an application function, an indication of which at least one synchronization parameter to determine.

The apparatus may be caused to receive policy information from a policy control function and determining at least one of the indicator of the synchronization level and the synchronization profile based on the policy information.

In a sixth aspect there is provided an apparatus comprising: at least one processor and at least one memory including a computer program code, the at least one memory and computer program code configured to, with the at least one processor, cause the apparatus at least to receive, from a first network function at a user equipment, at least one of an indicator of a synchronization level, a synchronization policy and a synchronization profile for a time synchronization service and configure or update the time synchronization service based on the received at least one of indicator of the synchronization level, synchronization policy and synchronization profile.

The apparatus may be caused to provide a request from the user equipment to the first network function for the time synchronization service, the request comprising of an indicator of a synchronization level and at least one synchronization parameter.

The request may comprise a request for synchronization parameters for the time synchronization or a request to modify synchronization parameters for the time synchronization service.

The indicator of the synchronization level may comprise a scalar.

The at least one synchronization parameter and/or the synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with synchronization service configuration.

The apparatus may be caused to receive the at least one of indicator of the synchronization level, the synchronization policy and the synchronization profile during a configuration update procedure.

The apparatus may be caused to receive the at least one of the indicator of the synchronization level, the synchronization policy and the synchronization profile using protocol data unit session management messages.

The indicator of the synchronization level, the synchronization policy and the synchronization profile may be associated with a protocol data unit session.

The apparatus may be caused to provide, the first network function, an indication of which at least one synchronization parameter to determine.

In a seventh aspect there is provided a computer readable medium comprising program instructions for causing an apparatus to perform at least the following receiving, at a first network function, a request for a time synchronization service for a user equipment, the request comprising one of an indicator of a synchronization level and at least one synchronization parameter, if the at least one synchronization parameter is comprised in the request, determining, based on the at least one synchronization parameter, the indicator of the synchronization level, determining, based on at least one of the indicator of the synchronization level or the at least one synchronization parameter, at least one of synchronization policy and synchronization profile and providing the determined at least one of the indicator of the synchronization level, the synchronization policy and the synchronization profile to at least one of a further network function and the user equipment.

The indicator of the synchronization level may comprise a scalar.

The at least one synchronization parameter and/or synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with a synchronization service configuration.

The apparatus may be caused to perform providing the determined at least one of the indicator of the synchronization level, the synchronization policy and the synchronization profile to the user equipment during a configuration update procedure.

The apparatus may be caused to perform providing the determined at least one of the indicator of the synchronization level, the synchronization policy and the synchronization profile to the user equipment using protocol data unit session management messages.

The determined at least one of the indicator of the synchronization level, the synchronization policy and the synchronization profile may be associated with a protocol data unit session.

The apparatus may be caused to perform receiving the one of the indicator of the synchronization level or the at least one synchronization parameter from at least one of the user equipment and an application function.

The request may comprise a request for synchronization parameters for the time synchronization or a request to modify synchronization parameters for the time synchronization service.

The further network function may be an application function.

The apparatus may be caused to perform receiving, from at least one of the user equipment and an application function, an indication of which at least one synchronization parameter to determine.

The apparatus may be caused to perform receiving policy information from a policy control function and determining at least one of the indicator of the synchronization level and the synchronization profile based on the policy information.

In an eighth aspect there is provided a computer readable medium comprising program instructions for causing an apparatus to perform at least the following receiving, from a first network function at a user equipment, at least one of an indicator of a synchronization level, a synchronization policy and a synchronization profile for a time synchronization service and configuring or updating the time synchronization service based on the received at least one of indicator of the synchronization level, synchronization policy and synchronization profile.

The apparatus may be caused to perform providing a request from the user equipment to the first network function for the time synchronization service, the request comprising of an indicator of a synchronization level and at least one synchronization parameter.

The request may comprise a request for synchronization parameters for the time synchronization or a request to modify synchronization parameters for the time synchronization service.

The indicator of the synchronization level may comprise a scalar.

The at least one synchronization parameter and/or the synchronization profile may comprise at least one of synchronization accuracy, message rate, use of propagation delay compensation, user equipment capability for propagation delay compensation, timing advance related information, time domain and synchronization delivery method.

The indicator of the synchronization level may be associated with synchronization service configuration.

The apparatus may be caused to perform receiving the at least one of indicator of the synchronization level, the synchronization policy and the synchronization profile during a configuration update procedure.

The apparatus may be caused to perform receiving the at least one of the indicator of the synchronization level, the synchronization policy and the synchronization profile using protocol data unit session management messages.

The indicator of the synchronization level, the synchronization policy and the synchronization profile may be associated with a protocol data unit session.

The apparatus may be caused to perform providing, the first network function, an indication of which at least one synchronization parameter to determine.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flowchart of a method according to an example embodiment;

FIG. 5 shows a flowchart of a method according to an example embodiment;

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
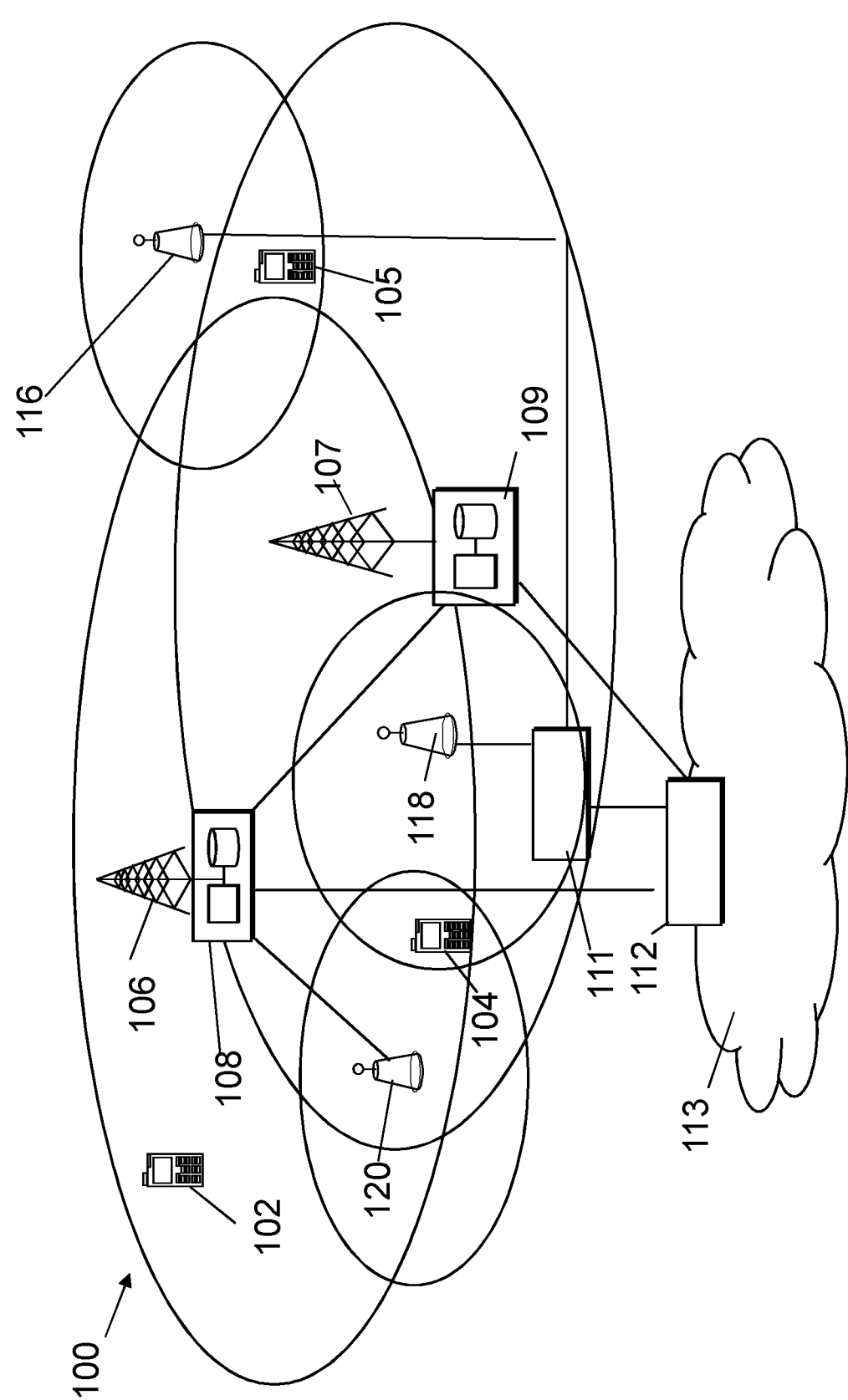
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations.

The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements may include at least Access and Mobility management Function (AMF), Session Management Function (SMF), User Plane Function (UPF) and Policy Control Function (PCF). Mechanisms described in the document are applicable regardless of the access technology used for the User Equipment to connect to the network (3GPP Radio technology such as NR, non 3GPP Radio technology as defined by IEEE, satellite access, wireline access etc.).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer Quality of Service (QoS) support, and some on-demand requirements for e.g. QoS levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G CN comprises functional entities. The CN is connected to a UE via the radio access network (RAN). A User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by a Session Management Function (SMF) that receives policies from a Policy Control Function (PCF). The CN may also include an Access & Mobility Function (AMF).

A Network Repository Function (NRF), provides network function (NF) service registration and discovery, enabling NFs to identify appropriate services in one another.

Figure 2:
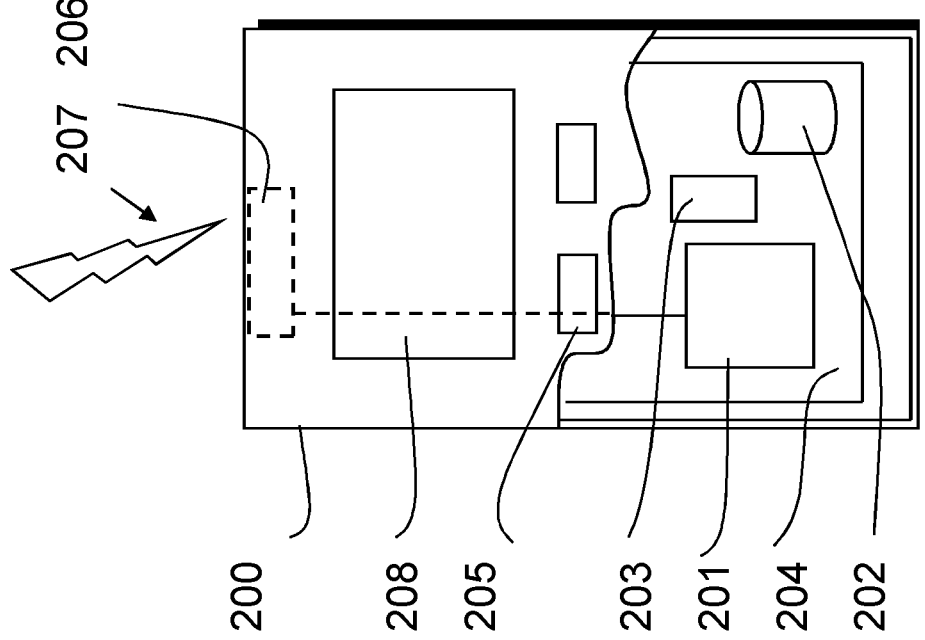
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 3 transceiver apparatus is designated schematically by block 206. The transceiver apparatus 206 may be provided for example by means of a radio part and associated antenna arrangement. The antenna arrangement may be arranged internally or externally to the mobile device.

Figure 3:
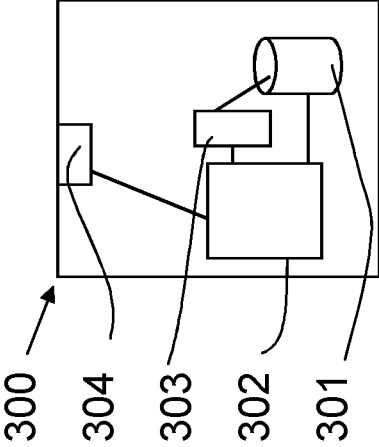
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

In Rel-16, for supporting Time Sensitive Networking (TSN) time synchronization, the end-to-end (E2E) 5G system may be considered as an IEEE 802.1AS "time-aware system" [23.501]. Only the TSN Translators (TTs) at the edges of the 5G system need to support the IEEE 802.1AS operations. The UE, gNB, UPF, Network-Side TSN Translator (NW-TT) and Device-Side TSN translator (DS-TT) are synchronized with the 5G Grand Master (GM) clock (i.e. the 5G internal system clock) which serves to keep these network elements synchronized.

Therefore, TSN Time Synchronization has two synchronization processes: 5GS synchronization and TSN domain synchronization. Each process can be considered independent from each other and the gNB only needs to be synchronized to the 5G GM clock. The distribution of the 5G GM clock shall be made available to all user plane nodes in the 5G system The 5G internal system clock may be made available to UPFs (and NW-TT) via the underlying Precision Time Protocol (PTP) compatible transport network with mechanisms outside the scope of 3GPP.

The 5G internal system clock may be made available to a UE via signaling of time information related to absolute timing of radio frames, e.g., as described in TS 38.331. The UE may then make the 5G internal system clock available to the DS-TT.

Rel-16 added some basic definitions for synchronization support in the standard and Rel-17 starts part of the overall concept for extended synchronization service enablers. One part of the approved Shared Information Data (SID) on enhanced support of Industrial Internet-of Things (IoT) (FS_IIoT) [S2-1910756] in Rel-17 is linked to synchronization capabilities in 5G. For example, the enhanced support of integration with IEEE TSN includes in its scope the support of multiple working clocks domains connected to the UE, uplink synchronization via 5GS, or time synchronization of UE(s) with the TSN Grand Master (GM) UE via 5GS. Additionally, the enhanced support of deterministic applications includes the extension of the exposure apparatus to support time synchronization.

Synchronization, as a service concept, provides Application Functions (AFs) and/or UEs with the possibility of requesting the 5GS specific configuration(s) regarding the synchronization needed for targeted UEs.

Different applications require different level of synchronization service depending on the nature of the application. Different levels of synchronization service may require different engagement of network resources. Similarly to QoS characteristics, there may be several services that are assumed to request similar synchronization configurations and thus these frequently requested configurations may benefit from optimized signalling by using standardized configurations. For each different synchronization configuration, there may be an implicit/coupled relation between synchronization parameters, such as target synchronization accuracy, and network configuration, such as message rate (i.e. SIB/RRC or gPTP messages), that makes it simpler for the AF (and/or UEs) if the synchronization parameters are provided in the synchronization configuration.

A 5G QoS Identifier (5QI) is a 5GS functionality which provides the QoS characteristics for user plane. A 5QI is a scalar that is used as a reference to 5G QoS characteristics [23.501]. Standardized or pre-configured characteristics of the 5QIs are not signaled on any interface, since they are standardized for a given 5QI (specified in TS 23.501 table 5.7.4-1). If certain 5G QoS characteristics are modified for a given 5QI, then the modification is signaled as part of the QoS profile in the network.

To configure the synchronization, the current work on SA2 includes the exposure of time synchronization, where the AF may learn 5GS capabilities to support time synchronization, request time synchronization with specified requirements (via, e.g., external parameter provisioning), and supply information that can be used to optimize and configure time synchronization procedure for connected devices. Each of the different parameters within the AF request may need their own information element.

FIG. 4 shows a flowchart of a method according to an example embodiment. The first network function may be a SMF or a PCF.

In a first step, S1, the method comprises receiving, at a first network function, a request for a time synchronization service for a user equipment, the request comprising one of an indicator of a synchronization level and at least one synchronization parameter.

In a second step, S2, the method comprises, if the at least one synchronization parameter is comprised in the request, determining, based on the at least one synchronization parameter, the indicator of the synchronization level.

In a third step, S3, the method comprises determining, based on at least one of the indicator of the synchronization level or the at least one synchronization parameter, at least one of synchronization policy and synchronization profile.

In a fourth step, S4, the method comprises providing the determined at least one of the indicator of the synchronization level, the synchronization policy and synchronization profile to at least one of a further network function and the user equipment.

FIG. 5 shows a flowchart of a method according to an example embodiment. The method may be performed at a UE.

In a first step, T1, the method comprises receiving, from a first network function at a user equipment, at least one of an indicator of a synchronization level, a synchronization policy and a synchronization profile for a time synchronization service.

In a second step, T2, the method comprises configuring or updating the time synchronization service based on the received at least one of indicator of the synchronization level, synchronization policy and synchronization profile.

The method may comprise providing a request from the user equipment to the first network function for the time synchronization service, the request comprising one of the at least one synchronization parameter or the indicator of a synchronization level. Alternatively, the request may be provided from an application function for the time synchronization service. The request may be a request for synchronization parameters for the time synchronization service or a request to modify synchronization parameters for the time synchronization service.

The indicator of the synchronization level may comprise a scalar (referred to as a synchronization level scalar). A 5G synchronization level scalar may be referred to as a 5SI. The request may comprise the indicator of the synchronization level, along with additional synchronization parameters to complement the indicator.

The at least one synchronization parameter may be a parameter associated with a synchronization service configuration.

That is, the method provides a synchronization level scalar that is used as a reference to a one or a combination of parameters of a synchronization service configuration. This one or combination of parameters defines a synchronization profile for the time synchronization service for the UE.

The request for Time Synchronization service from the AF (and/or UEs) may be translated to a certain 5G synchronization level scalar (5SI) by the network. That is, the indicator of the synchronization level may be associated with synchronization service configuration.

Figure 6:
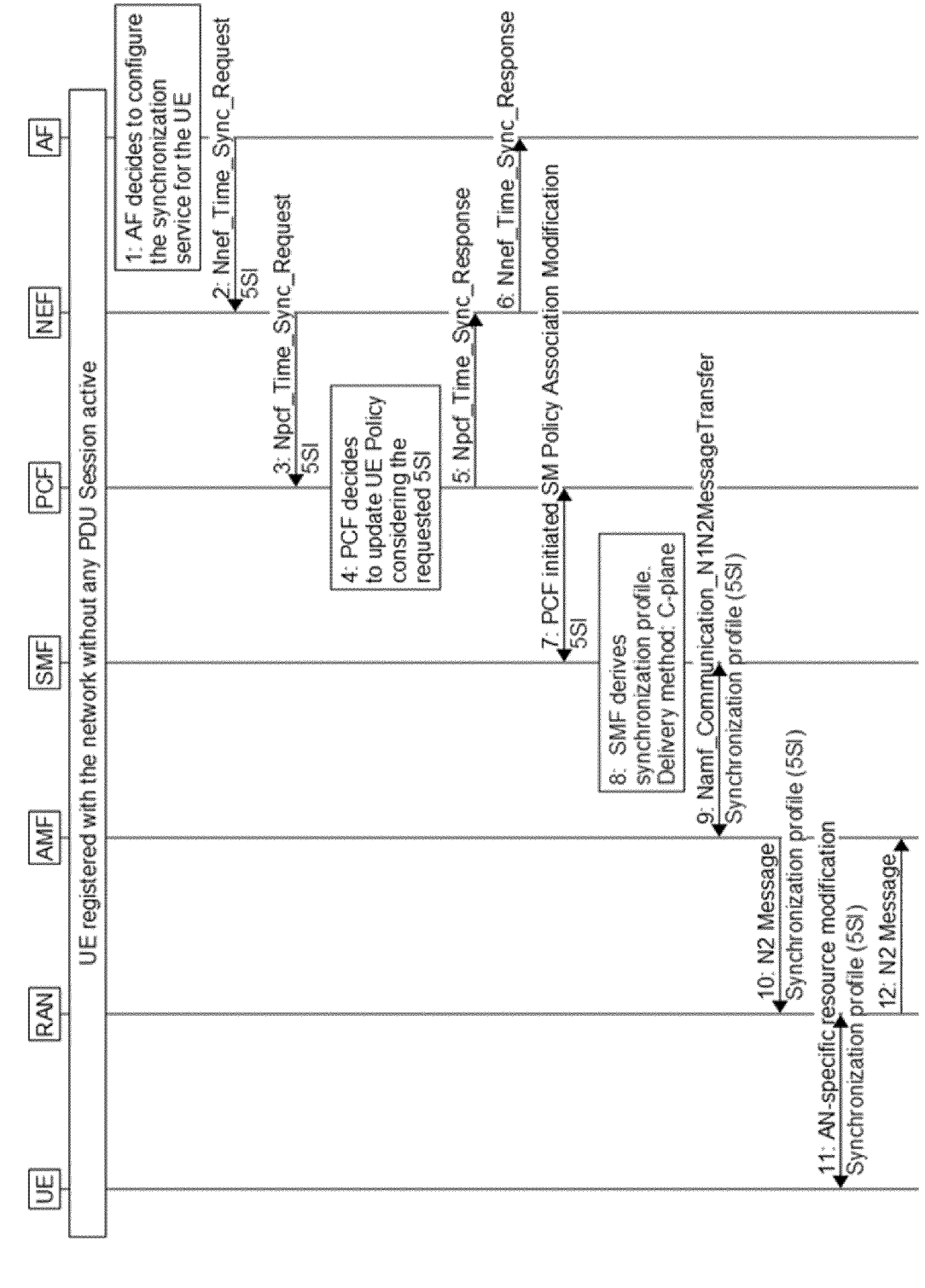
FIG. 6 shows an example signalling flow for AF-triggered synchronization service configuration (based on C-plane synchronization delivery)
Figure 7:
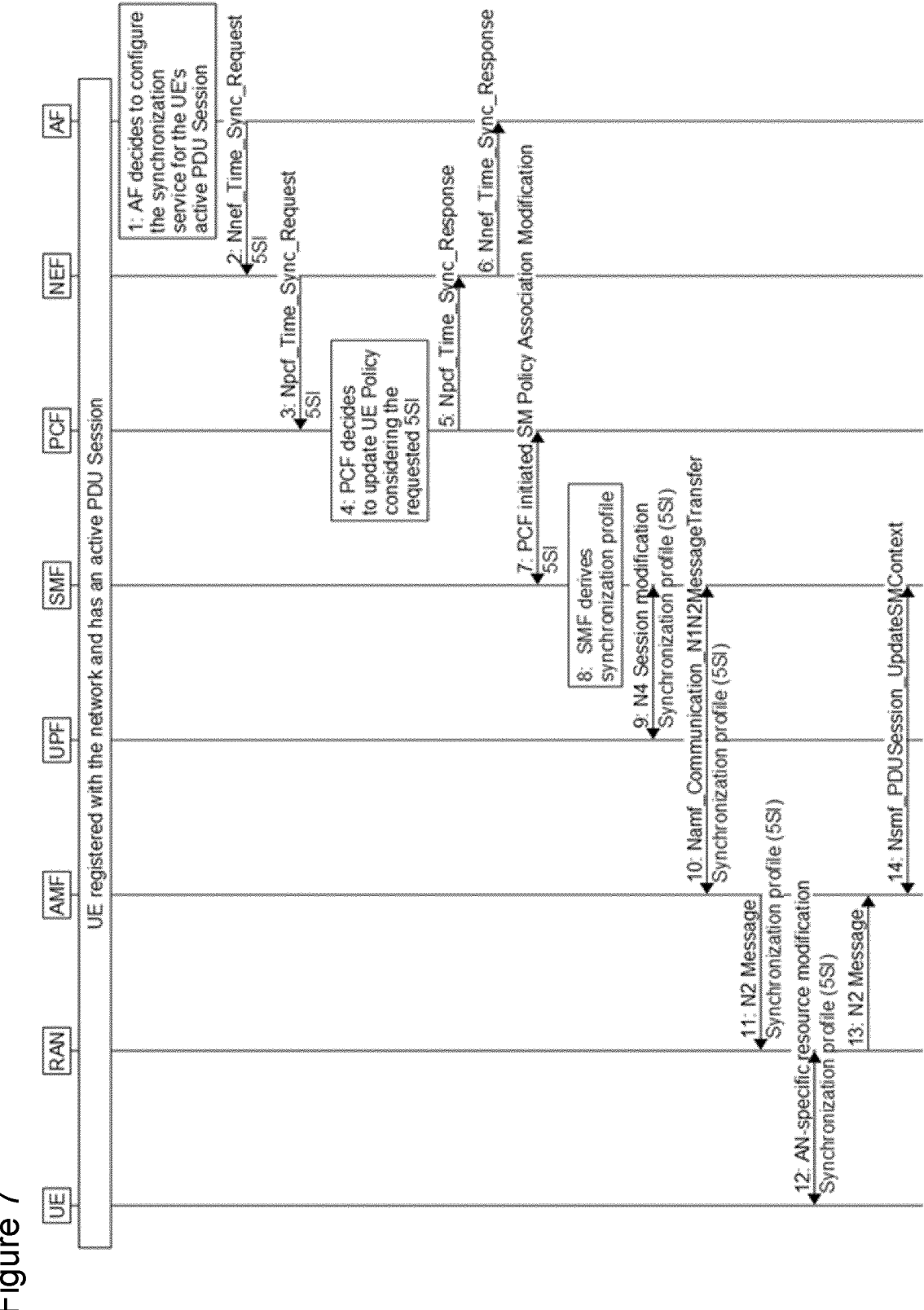
FIG. 7 shows an example signalling flow for AF triggered synchronization service configuration for a specific PDU session.

In one example embodiment, as shown in the signalling flows of FIG. 6 and FIG. 7, the AF (or UE) requests a specific 5SI, and then the network (i.e. PCF and/or SMF) decides how to provide the synchronization service requested (policies, confirm 5SI, rest of synchronization profile configuration, etc). The AF/UE may reduce the information that is sent to the network.

In a second example embodiment, the AF (or UE) provides a set of parameters (all or some of the synchronization parameters of a synchronization profile) and then the network (e.g., PCF and/or SMF) chooses the 5SI that better fits the request and the remaining synchronization parameters of the synchronization profile).

The 5SI may be used by the AF (and/or UEs) to request a specific synchronization service configuration.

Similar to 5QI functionality, the used 5SI value may reference a standardized synchronization service configuration. In this example embodiment, the 5SI has a one-to-one mapping to synchronization parameters. In this case the method comprises providing the indicator of the synchronisation level, e.g., 5SI, to the at least one of the further network function and the user equipment.

Alternatively, or in addition, the 5SI value may reference a dynamically assigned synchronization service configuration. In this example embodiment, the method comprises providing the synchronization profile (or at least part of the synchronization profile) to the at least one of the further network function and the user equipment.

The at least one synchronization parameter and/or synchronization profile may comprise at least one of level of synchronization accuracy, message rate (i.e. SIB9/RRC and/or gPTP messages), use of propagation delay compensation, UE capability for propagation delay compensation, Timing Advance (TA) related information, time domain and preferred synchronization delivery method (e.g., using C-plane (only SIB9, only RRC, or a SIB9/RRC combination), U-plane (e.g. in case of TSN or more generally DN time domain), or a combination of C-plane and U-plane (e.g., gPTP messages)). The 5SI and the associated synchronization profile may reference at least one of the synchronization service characteristics comprising the example synchronization parameters listed above.

The method may comprise receiving, from at least one of the user equipment and an application function, an indication of which at least one synchronization parameter to determine. That is, the AF (and/or UEs) may be enabled to request some of the parameters in the synchronization profile. The remaining parameters in the synchronization profile may be derived by the network.

There are some dependencies between the parameters and UE's connectivity and expected behaviour that may impact the synchronization service performance.

The synchronization profile may provide an information container to control how the synchronization service should be managed in the network. For example, the use of propagation delay compensation configuration may be crucial for some synchronization deployments (e.g., UE as a clock master forwarding synchronization messages to other UEs as clock consumers). The synchronization profile (and its associated 5SI) may describe if the compensation should be used or not, UE's capability for capability for propagation delay compensation and, optionally, the allowed update frequency of the 5SI configuration for the RAN (e.g. TA range controlled at the CN and forwarded to the RAN to control when to apply propagation delay compensation).

Synchronization as a service within the 5GS may have different alternatives that may impact the required functionality at the network to configure the service.

One alternative is stand-alone synchronization service. A synchronization service may be completely independent of a PDU Session. In an example embodiment, devices may request synchronization but not data transmission with the network. These cases do not need the establishment of a PDU Session thus the network function services associated with a PDU Session cannot be used to manage the synchronization (e.g. Nsmf_PDUSession). In this case the synchronization service may be configured only based on C-plane (without relying on any PDU Session). Therefore, the synchronization service needs its own signaling to manage the service provided.

In this alternative, the determined at least one of the indicator of the synchronization level, synchronization policy and synchronization profile may be provided to the user equipment during a configuration update procedure. In this case, the synchronization service has its own signaling to establish/modify/release the service, if the UE or the AF request it.

FIG. 6 shows a signalling diagram for an example embodiment for a UE that uses a synchronization service and C-plane delivery method. In this example embodiment, the synchronization service configuration is AF-triggered. The UE is registered with the network but does not have a PDU Session established as it does not require U-plane communication with a DN.

This may achieved by extending the UE Configuration Update procedure. In this case the procedure may be extended to enable UE-triggered UE Configuration Update procedure (i.e. UE triggering the PCF), and/or to include the synchronization profile information within the signaling messages.

Interactions may be added at AS and/or NAS level between UE/gNB/AMF/SMF to request/modify the synchronization profile.

In step 1 shown in FIG. 6, the AF decides to configure the synchronization service for the UE and, in steps 2 and 3, sends a Time synchronization request to the PCF, via the NEF, including the 5SI.

In step 4, the PCF decides to update UE policy, taking into account the requested 5SI.

In step 5 and step 6, the PCF sends the Time synchronization response to the AF, via the NEF.

In step 7, the PCF initiates an SM policy Association Modification at the SMF, and provides the 5SI to the SMF.

In step 8, the SMF derives the synchronization profile. The delivery method is via C-plane.

In steps 9 to 11, the SMF provides the synchronization profile to the UE via the AMF and RAN.

In step 12, the RAN provides an N2 message to the AMF.

Another alternative is the synchronization service is part of the PDU Session. In this case, the synchronization service depends on a PDU Session (it may be for TSN or not). Therefore, both U-plane configuration for the PDU Session and the synchronization service can share the same management procedures considering the exchange of new information elements in the network.

In this second alternative, the determined at least one of indicator of a synchronization level, synchronization policy and synchronization profile may be provided using PDU session management messages.

In this case the synchronization service may be configured with the same signaling alternatives mentioned in the previous option or the service may be linked to a specific PDU Session. For the latter, the synchronization service may be initially configured/modified/released by means of PDU Session management procedures (including in the signaling messages the synchronization profile information).

FIG. 7 shows an example signalling flow for a UE that use synchronization service and user plane traffic. The UE is registered with the network and has an active PDU session.

In step 1 shown in FIG. 7, the AF decides to configure the synchronization service for the UE's active PDU session. In steps 2 and 3 the AMF sends a Time synchronization request to the PCF, via the NEF, including the 5SI.

In step 4, the PCF decides to update UE policy, taking into account the requested 5SI.

In step 5 and step 6, the PCF sends the Time synchronization response to the AF, via the NEF.

In step 7, the PCF initiates an SM policy Association Modification at the SMF and provides the 5SI to the SMF.

In step 8, the SMF derives the synchronization profile.

In step 9, the SMF performs a session modification procedure at the UPF and provides the synchronization profile to the UPF.

In steps 10 to 12, the SMF provides the synchronization profile to the UE via the AMF and RAN.

In step 13, the RAN provides an N2 message to the AMF.

In step 14, the AMF provides a PDU session Update to the SMF.

Taking into account the two synchronization alternatives, the proposed 5SI and the synchronization profile, enabling the synchronization service in the 5GS may require changes regarding authorization, policy, etc, to build the whole service.

Based on the request received from the AF (and/or UE) and the information provided by the Policy Control Function (PCF), the Session Management Function (SMF) derives the synchronization profile and its associated 5SI. Later, the synchronization profile information is distributed to the rest of the network (e.g. a further network function such as PCF, UPF, AMF, the RAN or the UE).

In both of the example signaling alternatives the SMF receives the request from the UE or from the PCF (if the AF is triggering the signaling), derives the synchronization profile, and forwards the synchronization configuration to the rest of network entities. The synchronization configuration may be stored at other network entities as a part of the UE context.

Figure 8:
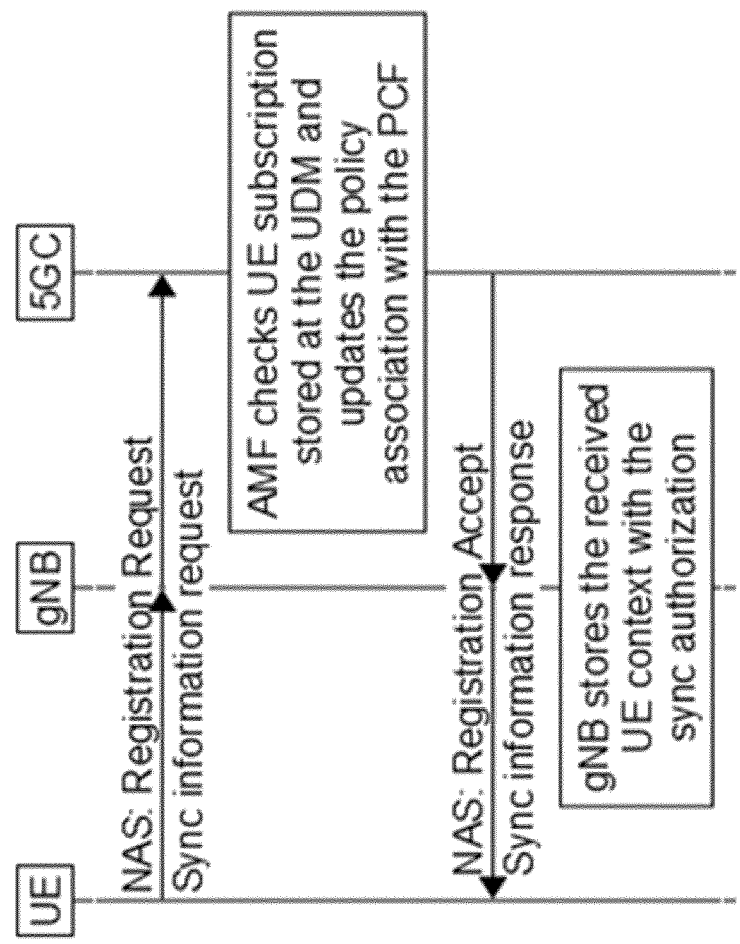
FIG. 8 shows an example signalling flow for synchronization authorisation distribution during UE registration procedure.

The 5GC may be responsible for the service authorization based on at least UE subscription, operator policies, UE capabilities and network capability. The UE is authorized to use synchronization when the UE context is established or modified by the 5GC. The synchronization authorization may be forwarded within the UE context from the 5GC to the gNB. FIG. 8 shows an example signalling flow for synchronization authorisation distribution during a UE registration procedure. Therefore, when the synchronization service has to be configured for a specific UE, the gNB already knows whether it is authorized or not.

For both alternatives (i.e. stand-alone synchronization or relying on a PDU Session), the Policy and Charging Control (PCC) framework may use the 5SI and derived synchronization profile as an input for policy decision. A method may comprise receiving the at least one of the indicator of the synchronization level or at least one synchronization parameter from the AF (or UE) at a network function such as a PCF and determining policy information based on the at least one synchronization parameter indicator (and the associated synchronization profile).

The policy information may be provided to the SMF for use in determining the at least one synchronization parameter or indicator of the synchronization level. In this embodiment, the method comprises providing the determined synchronization policy to the at least one of the further network function and the user equipment.

For the synchronization service as part of the PDU Session, the synchronization configuration may impact different PCC rule areas associated with the PDU Session treatment such as the QoS characteristics (e.g. needed QoS requirements may depend on gPTP rate configured), or the service data flow detection for the PDU Session transmitting the synchronization messages (e.g. UPF may need additional features when managing gPTP messages).

Therefore, the 5SI may be included as another field within the policy control.

The proposed synchronization profile and its associated 5SI may have a similar standardization impact than the QoS profile and the 5QI.

An apparatus may comprise means for receiving, at a first network function, a request for a time synchronization service for a user equipment, the request comprising one of an indicator of a synchronization level and at least one synchronization parameter, if the at least one synchronization parameter is comprised in the request, determining, based on the at least one synchronization parameter, the indicator of the synchronization level, determining, based on at least one of the indicator of the synchronization level or the at least one synchronization parameter, at least one of synchronization policy and synchronization profile and providing the determined at least one of the indicator of the synchronization level, the synchronization policy and the synchronization profile to at least one of a further network function and the user equipment.

Alternatively, or in addition, an apparatus may comprise means for receiving, from a first network function at a user equipment, at least one of an indicator of a synchronization level, a synchronization policy and a synchronization profile for a time synchronization service and configuring or updating the time synchronization service based on the received at least one of received indicator of the synchronization level, synchronization policy and a synchronization profile.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor; and
at least one memory including computer program code of a session management network function of a communication network, the computer program code configured to, when executed by the at least one processor, cause the apparatus to perform at least:
receiving, from an application function via a network exposure function of the communication network, a request for configuring a time synchronization service for a user equipment, the request comprising at least one synchronization parameter for the time synchronization service;
determining, based on the at least one synchronization parameter for the time synchronization service, a synchronization profile for the time synchronization service, wherein the synchronization profile comprises a configuration to be used by the user equipment for configuring the user equipment for the time sensitive service;
determining a scalar indicative of the synchronization level associated with the synchronization profile for the time synchronization service; and
providing to the user equipment, the scalar indicative of the synchronization level for the time synchronization service.

2. The apparatus of claim 1, wherein the the synchronization profile for the time synchronization service comprises at least one of synchronization accuracy, message rate, use of propagation delay compensation, user equipment capability for propagation delay compensation, timing advance related information, time domain and a synchronization delivery method.

3. The apparatus of claim 1, wherein the synchronization profile comprises a synchronization service configuration for the time synchronization service.

4. The apparatus of claim 1, wherein the providing comprises sending, to the user equipment, a configuration update command comprising the scalar indicative of the synchronization level for the time synchronization service.

5. The apparatus of claim 1, wherein the providing comprises sending, to the user equipment a protocol data unit session management message comprising the scalar indicative of the synchronization level for the time synchronization service.

6. The apparatus of claim 1, wherein the scalar indicative of the synchronization level for the time synchronization service is associated with a protocol data unit session.

7. A user equipment comprising:
at least one processor; and
at least one memory including computer program code, the computer program code configured to, when executed by the at least one processor, cause the user equipment at least to:
receive, from a session management function of a communication network, a scalar indicative of a synchronization level for a time synchronization service for the user equipment; and
configuring the user equipment for time synchronization service or updating a configuration of the user equipment for the time synchronization service based on a synchronization profile for the time synchronization service for the user equipment associated with the scalar indicative of the synchronization level for a time synchronization service for the user equipment.

8. The apparatus of claim 7, wherein the synchronization profile comprises at least one of synchronization accuracy, message rate, use of propagation delay compensation, user equipment capability for propagation delay compensation, timing advance related information, time domain and a synchronization delivery method for use in co.

9. The apparatus of claim 7, wherein the scalar indicative of a synchronization level for a time synchronization service is received in a configuration update command sent by the session management function.

10. The apparatus of claim 7, wherein the scalar indicative of the synchronization level is associated with a protocol data unit session.

11. An apparatus comprising:
at least one processor; and
at least one memory including computer program code of a session management network function of a communication network, the computer program code configured to, when executed by the at least one processor, cause the apparatus to perform at least:
receiving, from an application function via a network exposure function of the communication network, a request for configuring a time synchronization service for a user equipment, the request comprising a scalar indicative of a synchronization level for the time synchronization service;
determining, based on the scalar indicative of the synchronization level for the time synchronization service, a synchronization profile for the time synchronization service, wherein the synchronization profile comprises a configuration to be used by the user equipment for configuring the user equipment for the time sensitive service; and providing, to the user equipment, the synchronization profile for the time synchronization service for the time synchronization service.

\* \* \* \* \*